United States Patent
Park et al.

(10) Patent No.: US 10,126,606 B2
(45) Date of Patent: Nov. 13, 2018

(54) LIQUID CRYSTAL DISPLAY PANEL

(71) Applicant: Samsung Display Co. Ltd., Yongin (KR)

(72) Inventors: Hyung Jun Park, Seongnam-si (KR); Seong Young Lee, Hwaseong-si (KR); Youn Hak Jeong, Cheonan-si (KR); Ki Pyo Hong, Hwaseong-si (KR); Byoung Sun Na, Seoul (KR); Kye Uk Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 388 days.

(21) Appl. No.: 14/957,913

(22) Filed: Dec. 3, 2015

(65) Prior Publication Data
US 2016/0377930 A1    Dec. 29, 2016

(30) Foreign Application Priority Data
Jun. 24, 2015  (KR) .......................... 10-2015-0089550

(51) Int. Cl.
*G02F 1/1343*    (2006.01)
*G02F 1/1362*    (2006.01)
*G02F 1/1368*    (2006.01)

(52) U.S. Cl.
CPC ...... *G02F 1/134309* (2013.01); *G02F 1/1368* (2013.01); *G02F 1/136286* (2013.01); *G02F 2001/134345* (2013.01)

(58) Field of Classification Search
CPC ............... G02F 1/134309; G02F 2001/134345
USPC ........................................................ 349/144
See application file for complete search history.

(56) References Cited

U.S. PATENT DOCUMENTS

| | | | |
|---|---|---|---|
| 2010/0079690 A1* | 4/2010 | Lee ................... | G02F 1/133707 349/37 |
| 2013/0057813 A1* | 3/2013 | Jeong ................ | G02F 1/134309 349/110 |

FOREIGN PATENT DOCUMENTS

| KR | 1020140000459 | 1/2014 |
|---|---|---|
| KR | 1020140100126 | 8/2014 |
| KR | 1020140113035 | 9/2014 |

* cited by examiner

*Primary Examiner* — Thanh-Nhan P Nguyen
(74) *Attorney, Agent, or Firm* — Cantor Colburn LLP

(57) ABSTRACT

A liquid crystal display panel includes a first gate line and a second gate line extending in a first direction, a first data line and a second data line extending in a second direction, a pixel region surrounded by the first and second gate lines and the first and second data lines, and a first sub pixel electrode and a second sub pixel electrode disposed in the pixel region, wherein the first sub pixel electrode includes a first pattern section and a second pattern section symmetrical with each other about the second direction serving as an axis, wherein the second sub pixel electrode includes a third pattern section having a same shape as that of either the first pattern section or the second pattern section, and a fourth pattern section having a shape different from those of both the first pattern section and the second pattern section, wherein the first sub pixel electrode and the second sub pixel electrode are electrically interconnected.

17 Claims, 11 Drawing Sheets

LIQUID CRYSTAL DISPLAY PANEL

This application claims priority to Korean Patent Application No. 10-2015-0089550 filed on Jun. 24, 2015, and all the benefits accruing therefrom under 35 U.S.C. § 119, the content of which in its entirety is incorporated herein by reference.

BACKGROUND

1. Field

Exemplary embodiments of the invention relate to a liquid crystal display panel of a liquid crystal display device.

2. Description of the Related Art

Currently, liquid crystal display ("LCD") devices have become widespread as one of display devices.

An LCD device includes an LCD panel that has a thin film transistor substrate on which a thin film transistor and pixel electrodes are provided and a color filter substrate on which a color filter and a common electrode are provided, the two substrates facing each other with a liquid crystal layer interposed therebetween, and a backlight unit for providing light is disposed below the liquid crystal panel.

The LCD device includes pixel electrodes having a predetermined pattern, and the visibility, aperture ratio or the like of the LCD device can be dramatically affected by the design or arrangement of pixel electrodes. Thus, as the degree of freedom in designing the pixel electrodes increases, the performance of the LCD device becomes higher, and a higher degree of freedom is therefore required in designing pixel electrodes.

SUMMARY

An embodiment of the invention provides a liquid crystal display ("LCD") panel in which a high degree of freedom in a design thereof is ensured.

However, embodiments of the invention are not restricted to the one set forth herein. The other embodiments of the invention which are not mentioned herein will become more apparent to one of ordinary skilled in the art to which the invention pertains by referencing the detailed description of the invention given below.

According to an embodiment of the invention, there is provided an LCD panel in which a high degree of freedom in a design thereof is ensured.

However, effects of embodiments of the invention are not restricted to the exemplary embodiments set forth herein and more diverse effects are included in this description.

According to an exemplary embodiment of the invention, an LCD panel comprising, a first gate line and a second gate line extending in a first direction, a first data line and a second data line extending in a second direction, a pixel region surrounded by the first and second gate lines and the first and second data lines, and a first sub pixel electrode and a second sub pixel electrode disposed in the pixel region, wherein the first sub pixel electrode includes a first pattern section and a second pattern section symmetrical with each other about the second direction serving as an axis, wherein the second sub pixel electrode includes a third pattern section having a same shape as that of either the first pattern section or the second pattern section, and a fourth pattern section having a shape different from those of both the first pattern section and the second pattern section, wherein the first sub pixel electrode and the second sub pixel electrode are electrically interconnected.

In an exemplary embodiment, lengths of the first to fourth pattern sections in the first direction may be the same, and a length of the fourth pattern section in the second direction may be shorter than each of lengths of the first to third pattern sections in the second direction.

In an exemplary embodiment, each of the first to third pattern sections may include a central pattern part as a central region, and a branch pattern part extending from the central pattern part in the direction oblique to the first and second directions.

In an exemplary embodiment, each of the first and second sub pixel electrodes may be plural in number, and the second sub pixel electrode may be disposed adjacent to the first and second data lines.

In an exemplary embodiment, the fourth pattern section may be disposed closer to the first and second data lines than the third pattern section.

In an exemplary embodiment, the fourth pattern section may have a rectangular shape.

In an exemplary embodiment, the fourth pattern section may have a shape in which an end of an edge opposite to the third pattern section is cut out.

In an exemplary embodiment, the fourth pattern section may include a branch pattern part formed at an edge opposite to the third pattern section, where the branch pattern part of the fourth pattern section is disposed in an area smaller than that of a branch pattern part of the third pattern section.

According to another exemplary embodiment of the invention, an LCD panel comprising, a first gate line and a second gate line extending in a first direction, a first data line and a second data line extending in a second direction, a reference voltage line which is interposed between the first and second data lines and extends in the second direction, a pixel region surrounded by the first and second gate lines and the first and second data lines, and a first pixel electrode and a second pixel electrode disposed in the pixel region, a first switching element connected to the first data line, the first gate line and the first pixel electrode, a second switching element connected to the first data line, the first gate line and the second pixel electrode, and a third switching element connected to the reference voltage line, the first gate line and the first pixel electrode, wherein the first pixel electrode includes, first sub pixel electrodes each including a first pattern section and a second pattern section symmetrical with each other about the second direction serving as an axis, and second sub pixel electrodes each including a third pattern section having a same shape as that of either the first pattern section or the second pattern section, and a fourth pattern section having a shape different from those of both the first pattern section and the second pattern section, wherein the first sub pixel electrode and the second sub pixel electrode are electrically interconnected.

In an exemplary embodiment, lengths of the first to fourth pattern sections in the first direction may be the same, and a length of the fourth pattern section in the second direction may be shorter than each of lengths of the first to third pattern sections in the second direction.

In an exemplary embodiment, each of the first to third pattern sections may include a central pattern part as a central region, and a branch pattern part extending from the central pattern part in the direction oblique to the first and second directions.

In an exemplary embodiment, the reference voltage line may be disposed to be overlapped with a boundary in which the third pattern section and the fourth pattern section contact each other.

In an exemplary embodiment, the second sub pixel electrode may be disposed adjacent to the first and second data lines, where the fourth pattern section is disposed closer to the first and second data lines than the third pattern section.

In an exemplary embodiment, the fourth pattern section may have a rectangular shape.

In an exemplary embodiment, the fourth pattern section may include a branch pattern part formed at an edge opposite to the third pattern section, where the branch pattern part of the fourth pattern section is disposed in an area smaller than that of a branch pattern part of the third pattern section.

In an exemplary embodiment, the first pixel electrode may be plural in number and electrically interconnected, the first sub pixel electrodes may be plural in number and electrically interconnected, and the second sub pixel electrodes may be plural in number and electrically interconnected.

In an exemplary embodiment, the second pixel electrode further may include a detour part which interconnects two sub pixel electrodes which are not adjacent to each other among the plurality of first and second sub pixel electrodes In an exemplary embodiment, the detour part may be disposed to be at least partially overlapped with the first gate line or the second gate line.

In an exemplary embodiment, a data voltage applied to the first data line and a reference voltage applied to the reference voltage line may have the same polarity with respect to a common voltage.

In an exemplary embodiment, a voltage difference between the first pixel electrode and the common voltage may be larger than a voltage difference between the second pixel electrode and the common voltage.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
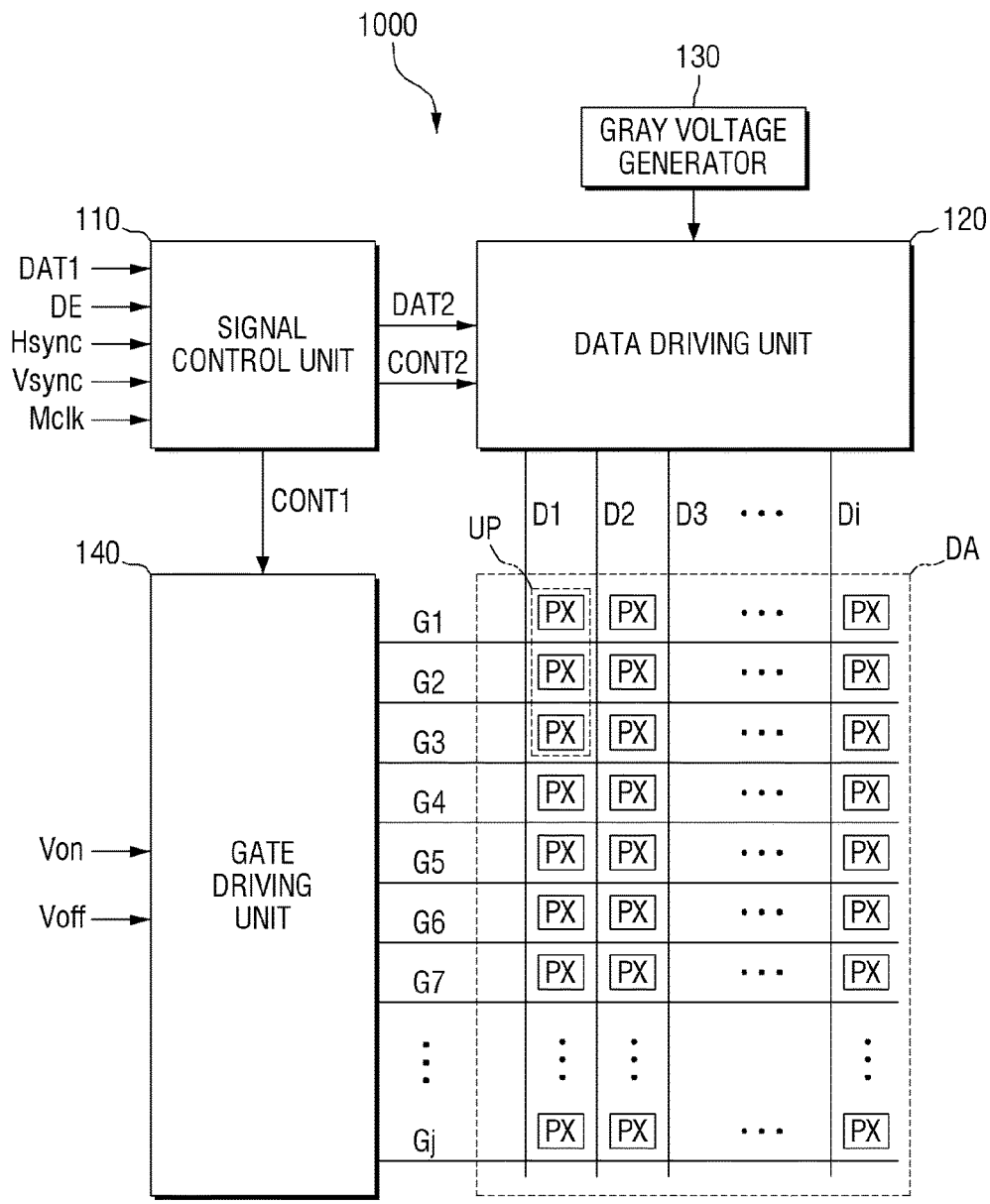
FIG. 1 is a block diagram of a liquid crystal display ("LCD") device according to an embodiment of the invention.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this invention will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In an exemplary embodiment, when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. In an exemplary embodiment, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments will hereinafter be described with reference to the accompanying drawings.

FIG. 1 is a block diagram of a liquid crystal display ("LCD") device according to an embodiment of the invention.

Referring to FIG. 1, an LCD device 1000 according to an embodiment of the invention includes a signal control unit 110, a data driving unit 120, a gate driving unit 140 and a display area DA.

The display area DA includes a plurality of pixels PXs. The plurality of pixels PXs may be arranged into a matrix. The display area DA may include a plurality of gate lines G1 to Gj extending in a first direction, and a plurality of data lines D1 to Di extending in a second direction intersecting the first direction. The plurality of gate lines G1 to Gj may receive a gate voltage provided from the gate driving unit 140, and the plurality of data lines D1 to Di may receive a data voltage provided from the data driving unit 120. Each pixel PX may be disposed in the area in which the gate lines G1 to Gj and the data lines D1 to Di intersect with each other.

Each pixel may uniquely display one of primary colors so as to realize color display. Examples of the primary colors may include red, green and blue colors. Throughout the specification, a pixel that displays a red color may be referred to as a red pixel, a pixel that displays a green color may be referred to as a green pixel, and a pixel that displays a blue color may be referred to as a blue pixel. In addition, three pixels having the respective colors may be grouped to be referred to as one upper pixel UP. However, the invention is not limited thereto, and each pixel may uniquely display may display various other colors.

Although the red pixel, the green pixel and the blue pixel are depicted as being alternately arranged in a row direction in FIG. 1, the invention is not limited thereto, and the pixels may be alternately arranged in a column direction, or the pixels may be provided at the respective vertices of a triangle, for example. The pixels may be arranged in various patterns other than the above-described one, and the invention is not limited to the arrangement of the pixels described above.

The signal control unit 110 may receive various signals provided from an external source and control the gate driving unit 140 and the data driving unit 120. In an exemplary embodiment, the signal control unit 110 may receive, as an input, first image data DAT1 and input control signals for controlling display of the first image data DAT1 from the external source and output a gate driving unit control signal CONT1, a data driving unit control signal CONT2, a second image data DAT2 and the like, for example.

The first image data DAT1 may include information on the luminance of each pixel PX in the display area DA. In an exemplary embodiment, the information on the luminance may have predetermined number of gray levels, for example, 1024(=2$^{10}$), 256(=2$^{8}$) or 64(=2$^{6}$) gray levels, for example, but the invention is not limited thereto, and the number of gray levels may vary to other values. The first image data DAT1 being input may be divided into frame units.

The input control signal transmitted to the signal control unit 110 may include, for example, a vertical synchronous signal Vsync, a horizontal synchronous signal Hsync, a main clock Mclk, a data enable signal DE and the like, for example. However, the invention is not limited thereto, and other kinds of signals may be further input.

The gate driving unit control signal CONT1 may be a signal for controlling operation of the gate driving unit 140, generated by the signal control unit 110. The gate driving unit control signal CONT1 may include a scan start signal, a clock signal and the like, for example, but the invention is not limited thereto, and the gate driving unit control signal CONT1 may further include various other signals. The gate driving unit 140 may generate a plurality of gate voltages capable of activating each pixel PX of the display area DA according to the gate driving unit control signal CONT1, and transmit the generated gate voltages to the corresponding gate line among the plurality of gate lines G1 to Gj.

The data driving unit control signal CONT2 generated by the signal control unit 110 may be a signal for controlling operation of the data driving unit 120. The data driving unit 120 may generate a plurality of data voltages according to the data driving unit control signal CONT2, and transmit the generated data voltages to the corresponding data line among the plurality of data lines D1 to Di.

Figure 2:
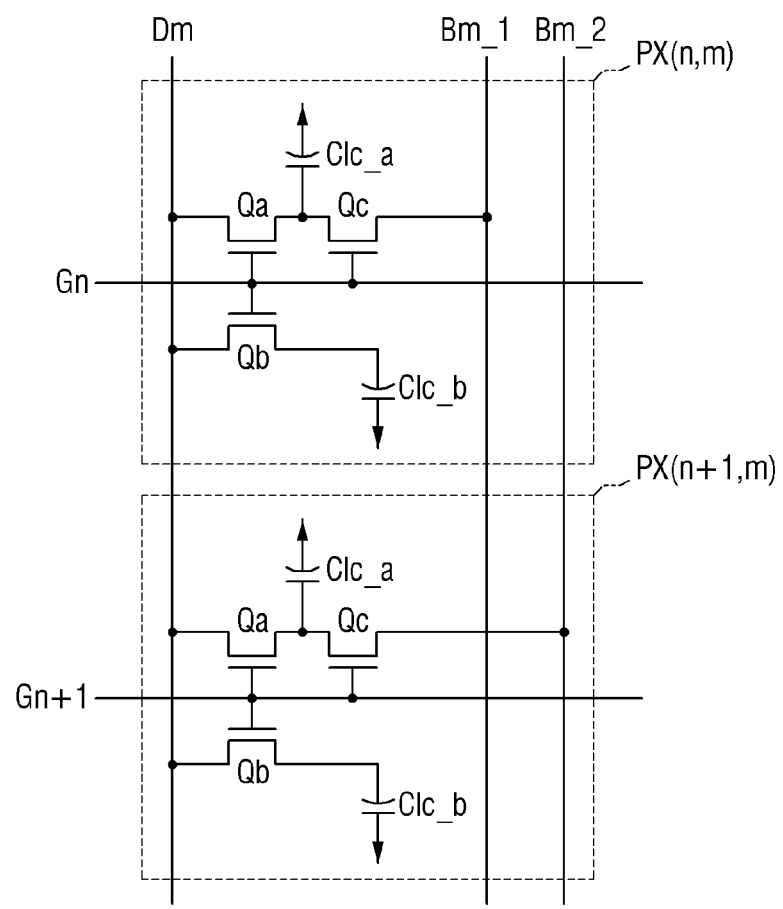
FIG. 2 is a circuit diagram of an equivalent circuit of a part of pixels of the LCD device according to the embodiment of the invention.

Although not shown in the drawings, the data driving unit 120 may generate a first reference voltage and a second reference voltage according to the data driving unit control signal CONT2, and transmit the generated first and second reference voltages to a first reference voltage line Bm_1 (refer to FIG. 2) and a second reference voltage line Bm_2 (refer to FIG. 2). This will be described in detail with reference to FIG. 2.

In the exemplary embodiment, each pixel PX may be disposed in the display area DA such that a horizontal length of each pixel PX may be longer than a vertical length thereof. Thus, when the plurality of pixels PXs form a single upper pixel UP that can display a certain color, the color can be displayed in the unit of three consecutive pixels PXs arranged in a vertical direction. In this case, since the horizontal length of one pixel PX is longer than the vertical length thereof, the number of data lines D1 to Di decreases and the number of gate lines G1 to Gj increases relatively more when compared with a pixel structure in which the horizontal length of one pixel PX is shorter than the vertical length thereof. Therefore, in the exemplary embodiment, as the total number of the data lines D1 to Di decreases, the number of integrated circuit chips required for designing the data driving unit 120 is reduced, thereby reducing a material cost. Although the number of gate lines G1 to Gj increases, it may cost less than manufacturing the data driving unit 120 since the gate driving unit 140 may be integrated on a thin film transistor substrate (not shown) together with the gate lines G1 to Gj, the data lines D1 to Di and the like. Even when the gate driving unit 140 is provided in the form of an integrated circuit chip, it may be more advantageous to reduce the number of the integrated circuit chips for the data driving unit since the price of the integrated circuit chip for the gate driving unit is relatively cheaper than that of the integrated circuit chip for the data driving unit.

FIG. 2 is a circuit diagram of an equivalent circuit of a part of pixels of the LCD device 1000 according to the embodiment of the invention.

Referring to FIG. 2, of the LCD device 1000 according to the embodiment of the invention may include a plurality of pixels, and FIG. 2 illustrates an equivalent circuit of two pixels PX(n,m) and PX(n+1,m) which are arranged consecutively in a column direction. Each pixel may be connected to the corresponding gate lines G1 to Gj and data lines D1 to Di depending on the column and row in which the pixels are arranged.

The first pixel PX(n,m) may be connected to an mth data line DLm and an nth gate line Gn, and the second pixel PX(n+1,m) may be connected to the mth data line DLm and an n+1th gate line Gn+1.

The LCD device 1000 may further include a plurality of reference voltage lines Bm_1 and Bm_2. The pixels PX(n,m) and PX(n+1,m) may be connected respectively to a pair of reference voltage lines Bm_1 and Bm_2 which transmits a predetermined reference voltage. The pair of reference voltage lines Bm_1 and Bm_2 may be arranged in parallel with the data line Dm. The pair of reference voltage lines Bm_1 and Bm_2 may include a first reference voltage line Bm_1 and a second reference voltage line Bm_2 which transmit reference voltages having different polarities.

The first reference voltage line Bm_1 and the second reference voltage line Bm_2 may be alternately connected to the pixels which are consecutively arranged. That is, one pixel may be connected to either the first reference voltage line Bm_1 or the second reference voltage line Bm_2, and the pixels connected to the first reference voltage line Bm_1 may not be consecutively arranged.

The first reference voltage and the second reference voltage may be applied to the first reference voltage line Bm_1 and the second reference voltage line Bm_2, respectively, and polarities of the first reference voltage and the second reference voltage may vary in each frame. In an exemplary embodiment, when the amplitude of a common voltage is approximately 7.5 volts (V), the first reference voltage may have a value of approximately 15 V or approximately 0 V in each frame, and the second reference voltage may have, conversely, a value of approximately 0 V or approximately 15 V, for example. The first reference voltage and the second reference voltage may be bigger than the maximum value of the absolute value of the data voltage applied to the data lines. Thus, the first reference voltage and the second reference voltage may boost the data voltage applied to a liquid crystal capacitor.

The first pixel PX(n,m) may include the first gate line Gn, the first data line Dm, and the first reference voltage line Bm_1, and a first switching element Qa, a second switching element Qb, a third switching element Qc, a first liquid crystal capacitor Clc_a and a second liquid crystal capacitor Clc_b connected to the first gate line Gn, the first data line Dm, and the first reference voltage line Bm_1. Furthermore, the first liquid crystal capacitor Clc_a may correspond to a first pixel electrode (not shown), and the second liquid crystal capacitor Clc_b may correspond to a second pixel electrode (not shown). The first and second pixel electrodes will be explained in detail later.

In an exemplary embodiment, each of the first switching element Qa, the second switching element Qb and the third switching element Qc may be a 3-terminal element such as a transistor.

The first switching element Qa may include a control terminal connected to the first gate line Gn, an input terminal connected to the first data line Dm, and an output terminal connected to the first liquid crystal capacitor Clc_a.

The second switching element Qb may include a control terminal connected to the first gate line Gn, an input terminal connected to the first data line Dm, and an output terminal connected to the second liquid crystal capacitor Clc_b.

The third switching element Qc may include a control terminal connected to the first gate line Gn, an input terminal connected to the first reference voltage line Bm_1 or the second reference voltage line Bm_2, and an output terminal connected to the second liquid crystal capacitor Clc_b.

The second pixel PX(n+1,m) which receives a data voltage from the same data line Dm and which is arranged adjacent to the first pixel PX(n,m) in a column direction may have a structure substantially the same as that of the first pixel PX(n,m), however, the third switching element Qc of the second pixel PX(n+1,m) may have an input terminal connected to the second reference voltage line Bm_2 rather than the first reference voltage line Bm_1. As described above, the third switching element Qc of the first pixel PX(n,m) and the third switching element Qc of the second pixel PX(n+1,m) which are arranged in the vicinity of each other in a row direction may have input terminals connected alternately to the first reference voltage line Bm_1 and the second reference voltage line Bm_2, thereby enabling the pixels to operate in different polarities.

Hereinafter, operation of each pixel will be described.

When a gate-on signal is applied to the first gate line Gn, the first switching element Qa, the second switching element Qb, and the third switching element Qc of the first pixel PX(n,m) connected to the first gate line Gn are turned on. Thus, the data voltage applied to the first data line Dm may be applied to one terminal of each of the first liquid crystal capacitor Clc_a and the second liquid crystal capacitor Clc_b of the first pixel PX(n,m) through the first switching element Qa and the second switching element Qb of the first pixel PX(n,m) which are turned on.

One terminal of the first liquid crystal capacitor Clc_a of the first pixel PX(n,m) may be connected to the output terminal of the third switching element Qc so as to receive, through the third switching element Qc, the first reference voltage applied to the first reference voltage line Bm_1.

In this case, the first reference voltage applied to the first reference voltage line Bm_1 may have a same polarity as that of the data voltage applied to the first data line Dm, and may have an absolute value bigger than that of the data voltage applied to the first data line Dm. Thus, the first reference voltage of the first reference voltage line Bm_1 to which a relatively higher voltage is applied may be divided through the third switching element Qc such that the voltage being charged to the first liquid crystal capacitor Clc_a may be boosted to have a value higher than that of the data voltage applied through the first data line Dm.

When the gate voltage of the first gate line Gn is changed to a gate-off voltage and the gate voltage of the second gate line Gn+1 is changed to a gate-on voltage, the first switching element Qa, the second switching element Qb, and the third switching element Qc of the second pixel PX(n+1,m) which are connected to the second gate line Gn+1 may be turned on. Thus, the data voltage applied to the first data line Dm may be applied to one terminal of each of the first liquid crystal capacitor Clc_a and the second liquid crystal capacitor Clc_b of the second pixel PX(n+1,m) through the first switching element Qa and the second switching element Qb of the second pixel PX(n+1,m) which are turned on.

In this case, the first liquid crystal capacitor Clc_a and the second liquid crystal capacitor Clc_b of the second pixel PX(n+1,m) may be charged with the same voltage. Furthermore, one terminal of the first liquid crystal capacitor Clc_a of the second pixel PX(n+1,m) may be connected to the output terminal of the third switching element Qc, and boosted by the second reference voltage applied to the second reference voltage line Bm_2 through the third switching element Qc.

In this case, the second reference voltage applied to the second reference voltage line Bm_2 may have a same polarity as that of the data voltage applied to the first data line Dm, and may have an absolute value bigger than that of the data voltage applied to the first data line Dm. Thus, the voltage of the second reference voltage line Bm_2 to which a relatively higher voltage is applied may be divided through the third switching element Qc such that the voltage being charged to the first liquid crystal capacitor Clc_a may be boosted to have a value higher than that of the data voltage applied through the first data line Dm.

Consequently, the voltage charged in the first liquid crystal capacitor Clc_a and the voltage charged in the second liquid crystal capacitor Clc_b may be different from each other in each of pixels PX(n,m) and PX(n+1,m). Since the voltage charged in the first liquid crystal capacitor Clc_a and the voltage charged in the second liquid crystal capacitor Clc_b may be different from each other, the tilt angles of the liquid crystal molecules in the first pixel electrode (not shown) and the second pixel electrode (not shown) may be different from each other, and thus the first pixel electrode (not shown) and the second pixel electrode (not shown) may have luminance different from each other. Consequently, when the voltage charged in the first liquid crystal capacitor Clc_a and the voltage charged in the second liquid crystal capacitor Clc_b are appropriately adjusted, the image viewed from the side may be close to the image viewed from the front, thereby improving side visibility.

Figure 3:
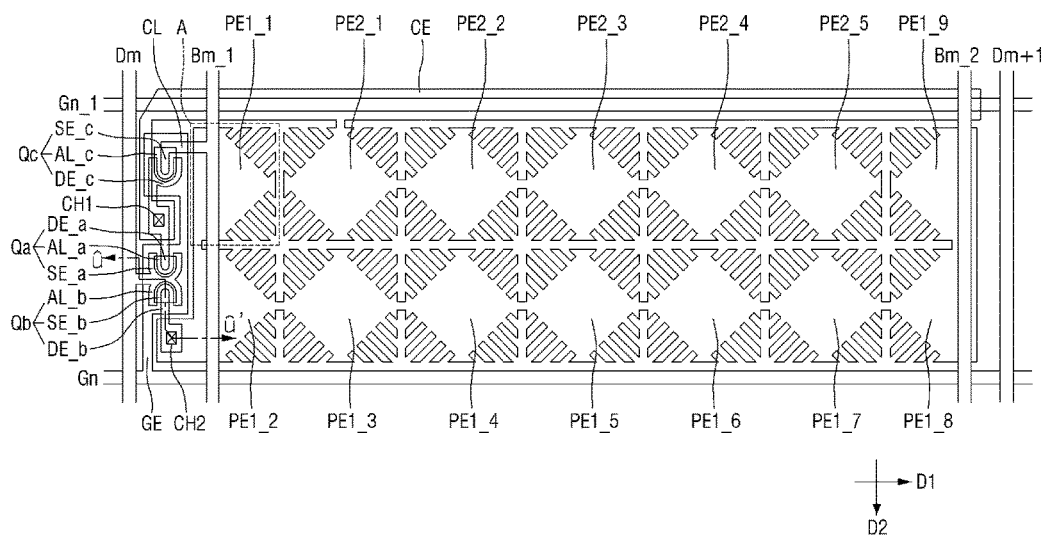
FIG. 3 is a plan view of one pixel of the LCD device according to the embodiment of the invention.
Figure 4:
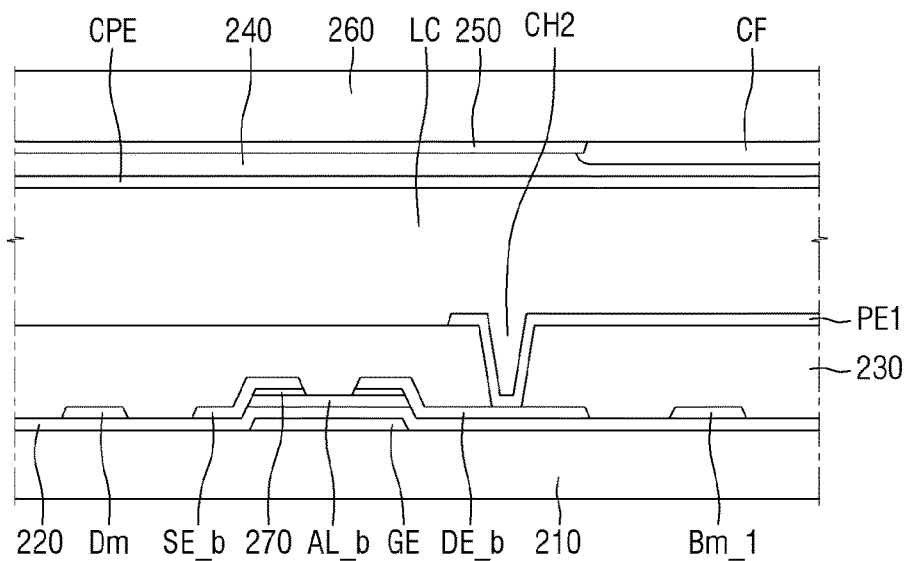
FIG. 4 is a cross-sectional view taken along the line I-I' of the LCD device of FIG. 3.

FIG. 3 is a plan view of one pixel of the LCD device according to the embodiment of the invention, and FIG. 4 is a cross-sectional view taken along the line I-I' of the LCD device of FIG. 3.

Referring to FIG. 3 and FIG. 4, the LCD device 1000 according to the embodiment of the invention may include a lower substrate 210 and an upper substrate 260 facing each other, and a liquid crystal layer LC interposed between the two substrates.

The gate line Gn and a gate electrode GE connected to the gate line Gn may be disposed on the lower substrate 210. A gate insulation layer 220 may be disposed on the gate line Gn and gate electrode GE.

Active layers AL_a, AL_b and AL_c may be disposed on the gate insulation layer 220, and a resistive contact member 270 may be disposed on the active layers AL_a, AL_b and AL_c. The active layers AL_a, AL_b and AL_c may be a semiconductor material, which passes or blocks current depending on the voltage applied to the gate electrode GE.

The data line Dm, source electrodes SE_a, SE_b and SE_c, drain electrodes DE_a, DE_b and DE_c, the first reference voltage line Bm_1 and the second reference voltage line Bm_2 may be disposed on the resistive contact member 270 and the gate insulation layer 220. In this case, the drain electrode DE_a of the first switching element Qa and the drain electrode DE_c of the third switching element Qc may be connected to each other.

A passivation layer 230 may be disposed on the data line Dm, source electrodes SE_a, SE_b and SE_c, drain electrodes DE_a, DE_b and DE_c, the first reference voltage line Bm_1 and the second reference voltage line Bm_2. The passivation layer 230 may include an inorganic insulating material or an organic insulating material.

A first contact hole CH1 and a second contact hole CH2 which expose a part of the drain electrodes DE_a, DE_b and DE_c of the respective switching elements Qa, Qb and Qc may be defined in the passivation layer 230, and the drain electrodes DE_a, DE_b and DE_c of the respective switching elements Qa, Qb and Qc may be physically connected to a first pixel electrode PE1 and a second pixel electrode PE2 through the first contact hole CH1 and the second contact hole CH2. However, each of the first pixel electrode PE1 and the second pixel electrode PE2 may further include a separate connection part CE so as to be connected to the first contact hole CH1 and the second contact hole CH2.

Although the connection part CE is depicted in FIG. 3 as interconnecting the first contact hole CH1 and the second pixel electrode PE2 and as being overlapped with the adjacent gate line Gn−1, the invention is not limited thereto, and the connection part CE may have other shapes. In an exemplary embodiment, although not shown, a separate contact hole may be defined to be connected to a layer where the gate line is formed, such that a separate line may be formed in the same layer as that of the gate line and connected to another contact hole in the portion where the separate line and the second pixel electrode are overlapped with each other.

Voltages different from each other may be provided to the first pixel electrode PE1 and the second pixel electrode PE2. Although the same data voltage may be provided to the first pixel electrode PE1 and the second pixel electrode PE2, the first pixel electrode PE2 may be boosted by the first reference voltage line Bm_1 or the second reference voltage line Bm_2, respectively, and thus the absolute value of the voltage of the second pixel electrode PE2 may be bigger than the absolute value of the voltage of the first pixel electrode PE1.

The first pixel electrode PE1 and the second pixel electrode PE2 may be disposed to have a predetermined area ratio. In an exemplary embodiment, when the area ratio of the first pixel electrode PE1 and the second pixel electrode PE2 is about 1.4:1, effects of improved visibility may be maximized.

The first pixel electrode PE1 may include first sub pixel electrodes PE1_3, PE1_4, PE1_5, PE1_6 and PE1_7 and second sub pixel electrodes PE1_1, PE1_2, PE1_8 and PE1_9, each having a predetermined pattern, and the second pixel electrode PE2 may include third sub pixel electrodes PE2_1, PE2_2, PE2_3, PE2_4 and PE2_5, each having a predetermined pattern.

Furthermore, the overall area ratio of the first pixel electrode PE1 and the second pixel electrode PE2 may be adjusted through the adjustment of the shape and number of the first to third sub pixel electrodes PE1_1, PE1_2, PE1_3, PE1_4, PE1_5, PE1_6, PE1_7, PE1_8, PE1_9, PE2_1, PE2_2, PE2_3, PE2_4 and PE2_5.

The first sub pixel electrodes PE1_3, PE1_4, PE1_5, PE1_6 and PE1_7 and the second sub pixel electrodes PE1_1, PE1_2, PE1_8 and PE1_9 constituting the first pixel electrode PE1 may be physically interconnected, and the third sub pixel electrodes PE2_1, PE2_2, PE2_3, PE2_4 and PE2_5 constituting the second pixel electrode PE2 may also be physically interconnected. However, the first pixel electrode PE1 and the second pixel electrode PE2 may be physically separated from each other.

Although, in FIG. 3, the first pixel electrode PE1 is depicted as including five first sub pixel electrodes PE1_3, PE1_4, PE1_5, PE1_6 and PE1_7 and four second sub pixel electrodes PE1_1, PE1_2, PE1_8 and PE1_9, and the second pixel electrode PE2 is depicted as including five third sub pixel electrodes PE2_1, PE2_2, PE2_3, PE2_4 and PE2_5, the number and shape of the sub pixel electrodes are not limited thereto, and the sub pixel electrodes may be arranged into other various patterns.

One of the first sub pixel electrodes PE1_3, PE1_4, PE1_5, PE1_6 and PE1_7 and the second sub pixel electrodes PE1_1, PE1_2, PE1_8 and PE1_9 may be disposed to be adjacent to another one of the first sub pixel electrodes PE1_3, PE1_4, PE1_5, PE1_6 and PE1_7 and the second sub pixel electrodes PE1_1, PE1_2, PE1_8 and PE1_9, and the first sub pixel electrodes PE1_3, PE1_4, PE1_5, PE1_6 and PE1_7 and the second sub pixel electrodes PE1_1, PE1_2, PE1_8 and PE1_9 which are adjacent to each other may be physically interconnected. Furthermore, one of the third sub pixel electrodes PE2_1, PE2_2, PE2_3, PE2_4 and PE2_5 may be disposed to be adjacent to at least another one of the third sub pixel electrodes PE2_1, PE2_2, PE2_3, PE2_4 and PE2_5, and the third sub pixel electrodes PE2_1, PE2_2, PE2_3, PE2_4 and PE2_5 which are adjacent to each other may be physically interconnected.

A light shielding member 250 may be disposed below the upper substrate 260. The light shielding member 250 can also be referred to as a black matrix serving to block light. Furthermore, the light shielding member 250 may be disposed in the region except for a region in which the first pixel electrode PE1 and the second pixel electrode PE2 are disposed, so as to prevent light leakage.

A color filter CF may be disposed below the upper substrate 260 and the light shielding member 250. The color filter CF may allow a specific wavelength band of incident light to pass but block the remaining wavelength band such that the light being emitted may have a specific color.

A cover layer 240 may be disposed below the light shielding member 250 and the color filter CF so as to prevent the color filter CF and the light shielding member 250 from escaping and suppress a liquid crystal layer from being contaminated by an organic material such as a solvent introduced from the color filter CF, thereby preventing faults such as after images which might otherwise be caused during operation of a screen. In another exemplary embodiment, the cover layer 240 may be omitted. A common electrode CPE may be disposed below the cover layer 240.

Although in FIG. 4, the light shielding member 250 and the color filter CF are depicted as being disposed below the upper substrate 260, the light shielding member 250 and the color filter CF may be disposed on the lower substrate 210 in the LCD device 1000 according to another embodiment of the invention. In this case, the passivation layer 230 of the lower substrate 210 may serve both as the passivation layer 230 and as the color filter CF.

The first pixel electrode PE1 and the common electrode CPE may form the first liquid crystal capacitor Clc_a together with the liquid crystal layer LC interposed therebetween, and the second pixel electrode PE2 and the common electrode CPE may also form the second liquid crystal capacitor Clc_b together with the liquid crystal layer LC interposed therebetween.

An electric field may be applied to the liquid crystal layer LC by the voltage applied to the first pixel electrode PE1 and the second pixel electrode PE2 and the common voltage applied to the common electrode. An alignment direction of liquid crystal molecules (not shown) in the liquid crystal layer LC may be determined by the intensity of the electric field, and the luminance of light passing through the liquid crystal layer LC may vary depending on the alignment direction of the liquid crystal molecules (not shown). Thus, the luminance of light may be determined while passing through the liquid crystal layer LC, and the color of light may be determined while passing through the color filter CF, thereby enabling one pixel PX to display a certain color.

The first sub pixel electrodes PE1_3, PE1_4, PE1_5, PE1_6 and PE1_7 and the third sub pixel electrodes PE2_1, PE2_2, PE2_3, PE2_4 and PE2_5 may be formed to have a symmetrical shape both in horizontal and vertical directions, but the second sub pixel electrodes PE1_1, PE1_2, PE1_8 and PE1_9 may be formed to have a shape which is symmetrical in a horizontal direction but asymmetrical in a vertical direction or a shape which is symmetrical in a vertical direction but asymmetrical in a horizontal direction.

As described above, when the first sub pixel electrodes PE1_3, PE1_4, PE1_5, PE1_6 and PE1_7 and the third sub pixel electrodes PE2_1, PE2_2, PE2_3, PE2_4 and PE2_5 are formed to into a symmetrical shape, but the second sub pixel electrodes PE1_1, PE1_2, PE1_8 and PE1_9 have an asymmetrical shape, the area ratio of the first pixel electrode PE1 and the second pixel electrode PE2 can adjusted in an easier manner than when all of the first to third sub pixel electrodes have the same shape.

Furthermore, the second sub pixel electrodes PE1_1, PE1_2, PE1_8 and PE1_9 may be arranged most adjacent to the data lines Dm and Dm+1 provided in left and right directions, and may also be arranged to be overlapped with the first reference voltage line Bm_1 and the second reference voltage line Bm_2.

The first to third sub pixel electrodes PE1_1, PE1_2, PE1_3, PE1_4, PE1_5, PE1_6, PE1_7, PE1_8, PE1_9, PE2_1, PE2_2, PE2_3, PE2_4 and PE2_5 may have a texture in a predetermined portion thereof according to a pattern thereof. In this case, "the texture" means a region in which liquid crystals are not smoothly controlled and transmittance of light is relatively lower even when a data voltage is applied.

In this case, when the region where the texture of the first to third sub pixel electrodes PE1_1, PE1_2, PE1_3, PE1_4, PE1_5, PE1_6, PE1_7, PE1_8, PE1_9, PE2_1, PE2_2, PE2_3, PE2_4 and PE2_5 overlaps the first reference voltage line Bm_1 or the second reference voltage line Bm_2, a reduction in an aperture ratio caused by the first reference voltage line Bm_1 and the second reference voltage line Bm_2 may be minimized since the texture that causes a lower transmittance of light is formed in the region.

Furthermore, as shown in FIG. 3, the second sub pixel electrodes PE2_1, PE2_2, PE2_3, PE2_4 and PE2_5 may be disposed adjacent to each of the data lines Dm and Dm+1, and parts of the second sub pixel electrodes PE2_1, PE2_2, PE2_3, PE2_4 and PE2_5 which have shapes difference from those of the first and third sub pixel electrodes PE1_3, PE1_4, PE1_5, PE1_6, PE1_7, PE2_1, PE2_2, PE2_3, PE2_4 and PE2_5 may be disposed toward each of the data lines Dm and Dm+1. In this case, the first reference voltage line Bm_1 and the second reference voltage line Bm_2 may be arranged closest to the data lines Dm and Dm+1, respectively, and thus a connection part CL for connecting the first reference voltage line Bm_1 or the second reference voltage line Bm_2 to the second switching element Qb can be minimized, thereby improving an aperture ratio.

In the illustrated exemplary embodiment, the LCD device 1000 is illustrated in that the LCD device 1000 includes the first pixel electrode PE1 and the second pixel electrode PE2 to which different voltages are applied, but the invention is not limited thereto, and only the first pixel electrode PE1 to which the same voltage is applied and in which the first sub pixel electrodes and the second sub pixel electrodes are included may be disposed in a pixel region.

Figure 5:
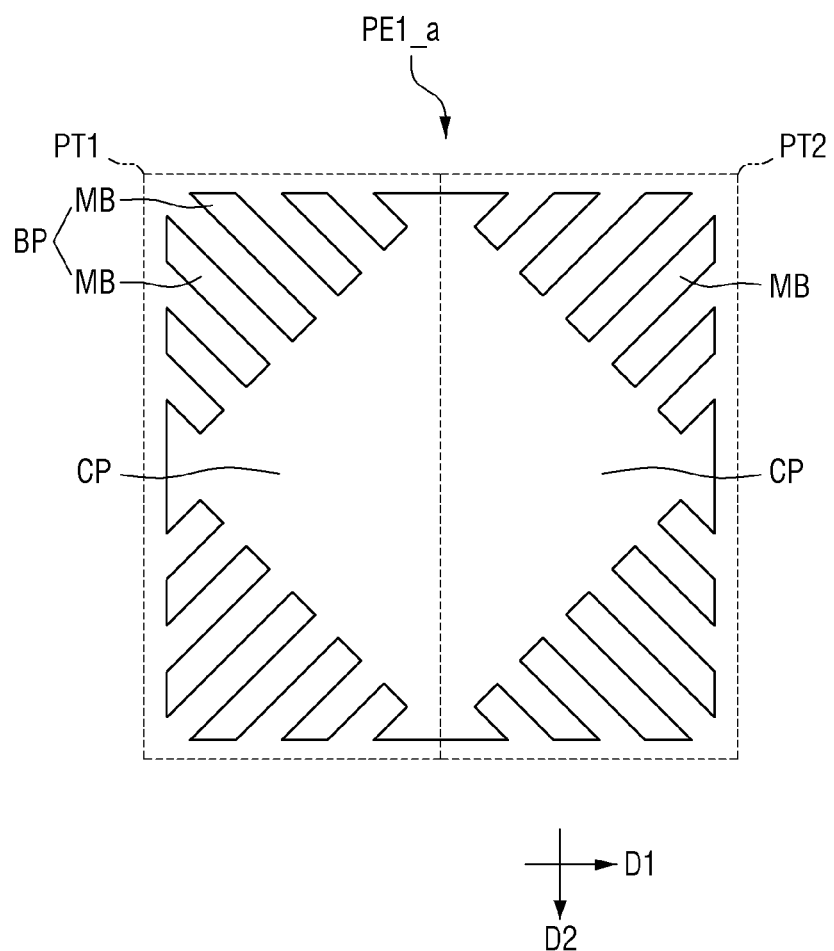
FIG. 5 is a plan view of a first sub pixel electrode having a vertical symmetrical shape according to the embodiment of the invention.

FIG. 5 is a plan view of the first sub pixel according to the embodiment of the invention.

For convenience, one of the first sub pixel electrodes PE1_3, PE1_4, PE1_5, PE1_6 and PE1_7 shown in FIG. 3 will be denoted as PE1_a, and one of the second sub pixel electrodes PE1_1, PE1_2, PE1_8, PE1_9 shown in FIG. 3 will be denoted as PE1_b hereinafter.

Referring to FIG. 5, the first sub pixel electrode PE1_a may include a first pattern section PT1 at a left side and a second pattern section PT2 at a right side about a virtual symmetrical axis intersecting the center of the first sub pixel electrode PE1_a and extending in a second direction D2.

The first pattern section PT1 and the second pattern section PT2 may be symmetrical with each other with reference to the virtual symmetrical axis extending in the second direction D2, and the first pattern section PT1 and the second pattern section PT2 may be physically in contact with each other and interconnected to form a single first sub pixel electrode PE1_a.

Furthermore, each of the first and second pattern sections PT1 and PT2 may include a central pattern part CP and a branch pattern part BP. The central pattern part CP may mean a central region in each of the first and second pattern sections PT1 and PT2, and a plurality of micro branches MBs extending from the central pattern part CP and arranged into a branch shape may be collectively referred to as the branch pattern part BP. The micro branches MBs may extend in the direction oblique to the first direction D1 and the second direction D2, and may be physically connected to the central pattern part CP.

As shown in the drawings, the central pattern part CP may have a triangular plate shape, for example, and in this case, an aperture (not shown) may be formed in the common electrode CPE in the region corresponding to the central pattern part CP so as to control liquid crystals in the region corresponding to the central pattern part CP.

When an electric field is applied to the liquid crystal layer LC, the branch pattern part BP and the central pattern part CP may interact with the common electrode CPE so as to form a fringe field, thus enabling liquid crystal molecules to tilt.

The liquid crystal molecules may tilt in directions different from each other depending along the direction of the branch pattern part, and thus domains with different orientation directions of liquid crystal molecules may be formed. When the direction in which the liquid crystal molecules are tilted varies as described above, visibility of the LCD device 1000 may be improved.

The first sub pixel electrode PE1_a is illustrated as an example in the embodiment, the invention is not limited thereto, and the third sub pixel electrodes PE2_1, PE2_2, PE2_3, PE2_4 and PE2_5 may have the same shape described in the embodiment.

In the embodiment, the first sub pixel electrode PE1_a is illustrated as an example in which the central pattern part CP has a lozenge-shaped plate, for example, but the invention is not limited thereto. In an exemplary embodiment, the central pattern part CP may have a cross shape, for example, by which the area occupied by the branch pattern part BP may become wider and the common electrode CPE may have a single plate without a separate aperture.

Figure 6:
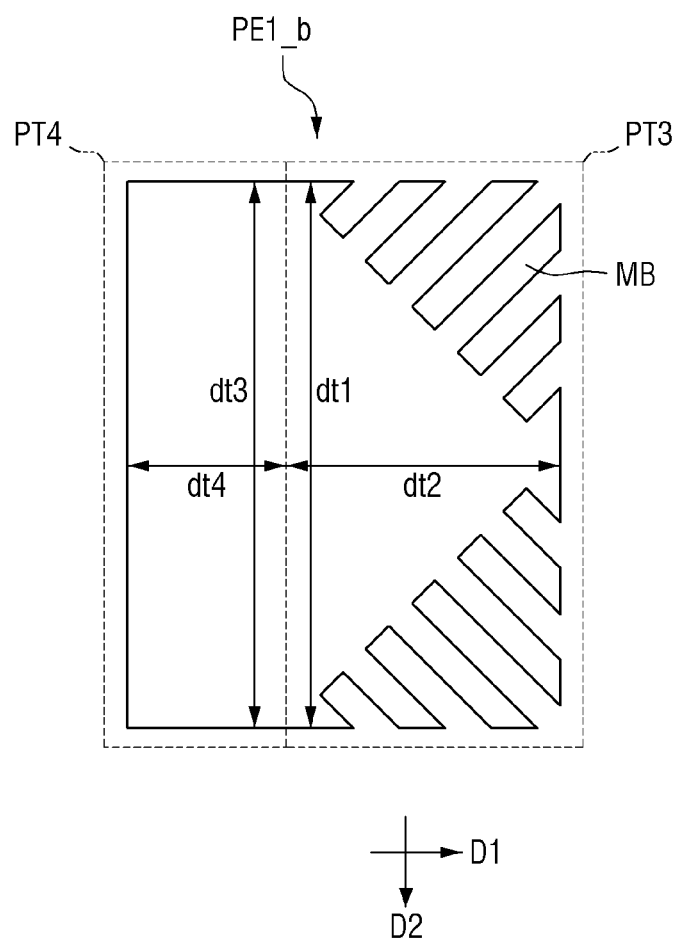
FIG. 6 is a plan view of a second sub pixel electrode having a vertical asymmetrical shape according to the embodiment of the invention.

FIG. 6 is a plan view of the second sub pixel electrode according to the embodiment of the invention.

Referring to FIG. 6, the second sub pixel electrode PE1_b according to the embodiment of the invention may include a third pattern section PT3 and a fourth pattern section PT4.

The third pattern section PT3 may have a same shape as that of either the first pattern section PT1 or the second pattern section PT2 of the first sub pixel electrode PE1_a shown in FIG. 5. In the embodiment, an example is illustrated in that the third pattern section PT3 has a same shape as that of the second pattern section PT2, but the invention is not limited thereto, and the third pattern section PT3 may have a same shape as that of the first pattern section PT1.

However, the fourth pattern section PT4 may have a shape different from those of both the first and second pattern sections PT1 and PT2. In the invention, the fourth pattern section PT4 having a rectangular plate shape is illustrated as an example, and the fourth pattern section PT4 may be physically in contact with and connected to the third pattern section PT3.

In this case, a length dt3 of the fourth pattern section PT4 extending in the second direction D2 may be the same as a length dt1 of the third pattern section PT3 extending in the second direction D2, however, a length dt4 of the fourth pattern section PT4 extending in the first direction D1 may be shorter than a length dt2 of the third pattern section PT3 extending in the first direction D1.

Thus, the second sub pixel electrode PE1_b may occupy a smaller area than the first sub pixel electrode PE1_a. Furthermore, the length dt4 of the fourth pattern section PT4 extending in the first direction D1 may be adjusted to freely adjust the area occupied by the second sub pixel electrode PE1_b, thereby achieving a higher degree of freedom in designing one pixel.

The first reference voltage line Bm_1 or the second reference voltage line Bm_2 may be arranged along a boundary line at which the third pattern section PT3 and the fourth pattern section PT4 contact each other. Since the region in which the boundary line exists is where the text occurs, a reduction in an aperture ratio caused by the first reference voltage line Bm_1 or the second reference voltage line Bm_2 may be minimized When the fourth pattern section PT4 has a rectangular shape as in the illustrated exemplary embodiment, a transmittance may be about 93.6% as compared to the first sub pixel electrode PE1_a having the same area with a left side thereof partially concealed.

The same shape may be applied when the fourth pattern section PT4 is provided at the right side of the third pattern section PT3 as well as when the fourth pattern section PT4 is provided at the left side of the third pattern section PT3.

Although in FIG. 6, the fourth pattern section PT4 is depicted as a rectangular plate without a pattern, the fourth pattern section PT4 may have various other shapes so as to improve controllability for liquid crystals in the region in which the fourth pattern section PT4 is disposed. This will be described with reference to FIG. 7 to FIG. 10.

FIG. 7 to FIG. 10 are plane views of the second pixel electrodes according to other embodiments of the invention.

Since the components in FIG. 7 to FIG. 10 are the same as those in the description provided with reference to FIG. 6 except for the part shown differently from FIG. 6, the repetitive description of the same component will be omitted.

Figure 7:
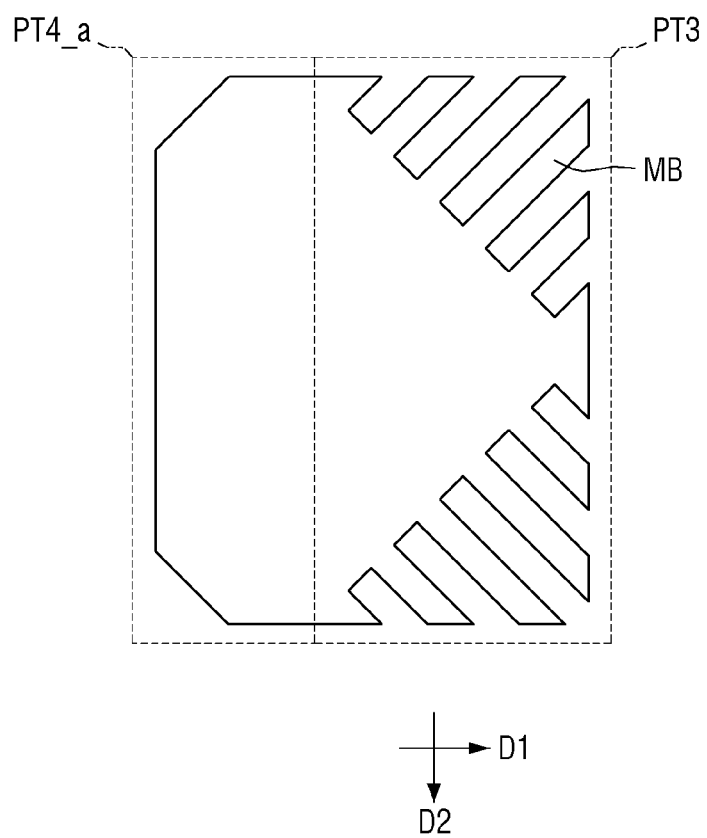
FIG. 7 is a plan view of an asymmetrical sub low pixel according to another embodiment of the invention.

Referring to FIG. 7, differently from the fourth pattern section PT4 shown in FIG. 6, a fourth pattern section PT4_a may have left corners obliquely cut out. In this case, a transmittance may be about 90.0% as compared to the first sub pixel electrode having the same area with a left side thereof partially concealed.

Figure 8:
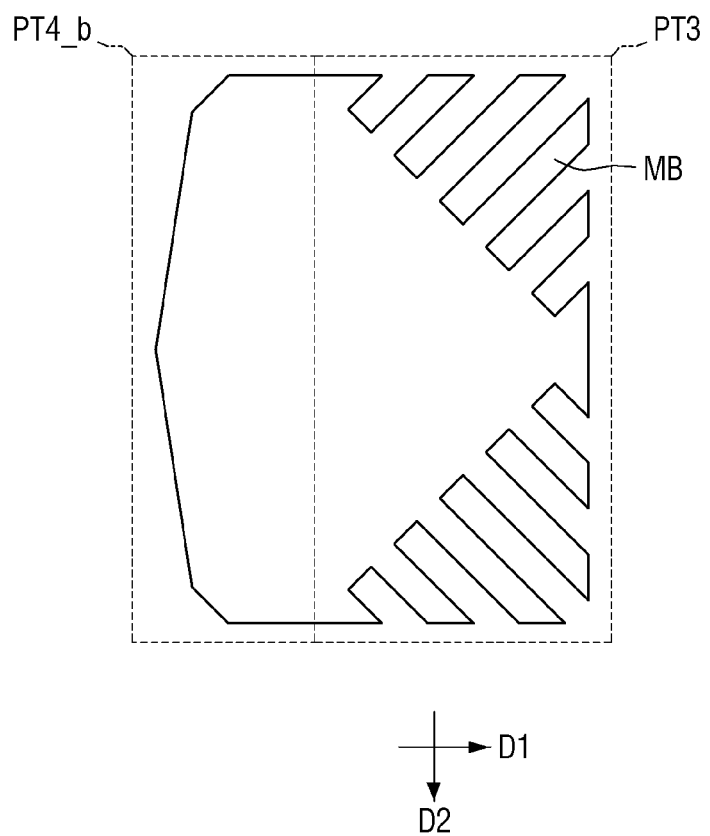
FIG. 8 is a plan view of an asymmetrical sub low pixel according to yet another embodiment of the invention.

Referring to FIG. 8, differently from the fourth pattern section PT4 shown in FIG. 6, a fourth pattern section PT4_b may have a left side cut twice from the top to the center thereof. In this case, a transmittance may be about 89.5% as compared to the first sub pixel electrode having the same area with a left side thereof partially concealed.

Figure 9:
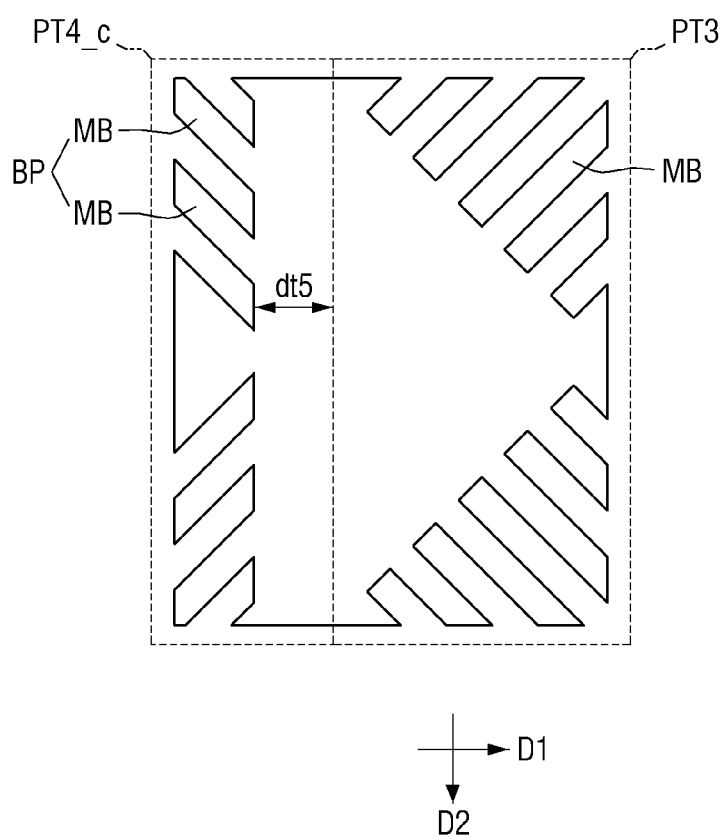
FIG. 9 is a plan view of an asymmetrical sub low pixel according to still another embodiment of the invention.

Referring to FIG. 9, differently from the fourth pattern section PT4 shown in FIG. 6, a fourth pattern section PT4_c of FIG. 9 may have the branch pattern part BP at a left side thereof. The branch pattern part BP may include fine branches MBs, and the orientation direction of liquid crystals may be controlled by fine branches MBs. The branch pattern part BP may be symmetrical with reference to a horizontal center line, and upper fine branches MBs may extend in a left upward direction and the lower fine branches MBs may extend in a left downward direction. In this case, a transmittance may be 89.9% as compared to the first sub pixel electrode having the same area with a left side thereof partially concealed.

Figure 10:
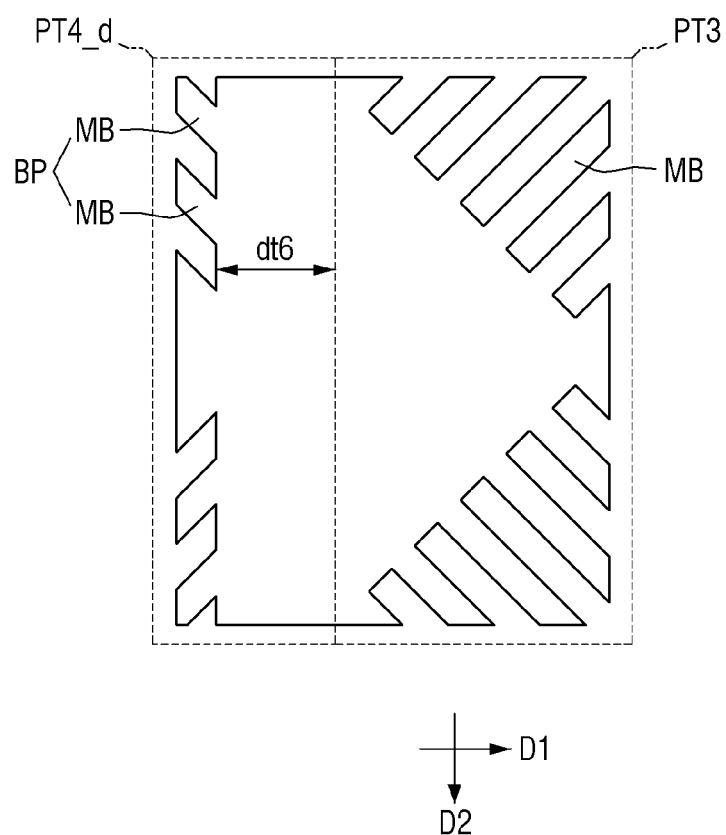
FIG. 10 is a plan view of an asymmetrical sub low pixel according to yet still another embodiment of the invention.

Referring to FIG. 10, similarly to the fourth pattern section PT4_c shown in FIG. 9, a fourth pattern section PT4_d of FIG. 10 may also include the branch pattern part BP at a left side thereof. However, as compared with the fourth pattern section PT4_c shown in FIG. 9, the branch pattern part BP in the fourth pattern section PT4_d of FIG. 10 may occupy a lesser area. That is, a distance dt6 from branch pattern part BP to a boundary between the third pattern section PT3 and the fourth pattern section PT4_d in FIG. 10 may be longer than a distance dt5 from the branch pattern part BP to a boundary between the third pattern section PT3 and the fourth pattern section PT4_c in FIG. 9. In this case, a transmittance may be 89.6% as compared to the first sub pixel electrode having the same area with a left side thereof partially concealed.

Figure 11:
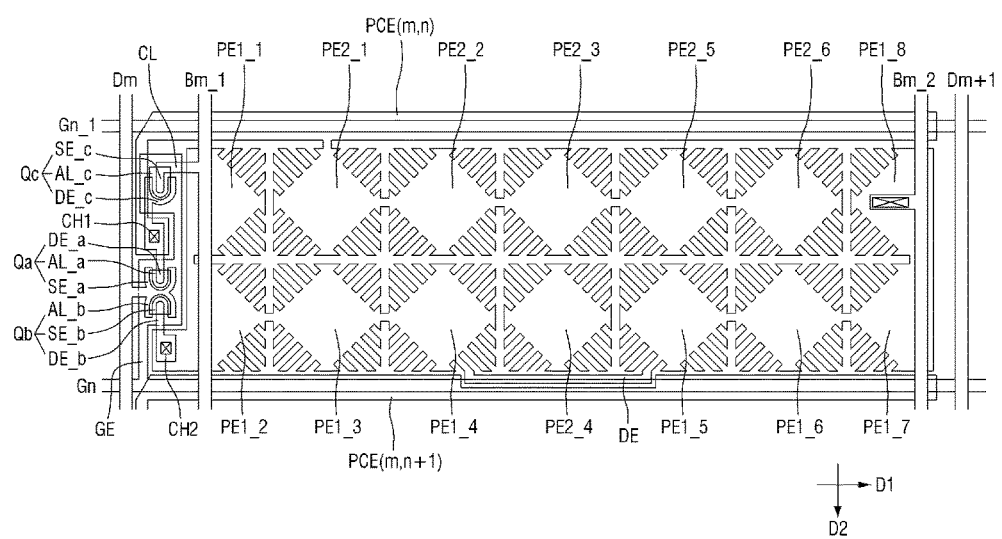
FIG. 11 is a plan view of one pixel of the LCD device according to another embodiment of the invention.

FIG. 11 is a plan view of one pixel of the LCD device 1000 according to another embodiment of the invention.

Since the components in FIG. 11 are the same as those in the description provided with reference to FIG. 3 except for the part shown differently from FIG. 3, the repetitive description of the same component will be omitted.

Referring to FIG. 11, differently from FIG. 3, a detour part DE may further be arranged so as to interconnect two first sub pixel electrodes PE1_4 and PE1_5 which are not adjacent to each other.

The detour part DE may include the same material as those of the first pixel electrode PE1 and the second pixel electrode PE2 and in the same layer with the first pixel electrode PE1 and the second pixel electrode PE2, and the detour part DE may be partially overlapped with the adjacent gate line Gn. That is, the detour part DE may be partially overlapped with the gate line Gn so as to detour around the third sub pixel electrode PE2_4 interposed between the two first sub pixel electrodes PE1_4 and PE1_5 which are not adjacent to each other.

Thus, the first sub pixel electrodes PE1_4 and PE1_5 may be physically interconnected even when the first sub pixel electrodes PE1_4 and PE1_5 are not arranged adjacent to each other. Consequently, the first pixel electrode PE1 and the second pixel electrode PE2 may further freely arranged.

However, the effects of the invention are not restricted to the one set forth herein. The above and other effects of the invention will become more apparent to one of daily skill in the art to which the invention pertains by referencing the claims.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A liquid crystal display panel comprising:
    a first gate line and a second gate line extending in a first direction;
    a first data line and a second data line extending in a second direction intersecting the first direction;
    a pixel region surrounded by the first and second gate lines and the first and second data lines; and
    a first sub pixel electrode and a second sub pixel electrode disposed in the pixel region,
    wherein the first sub pixel electrode includes a first pattern section and a second pattern section symmetrical with each other in the second direction,
    wherein the second sub pixel electrode includes a third pattern section having a same shape as that of either the first pattern section or the second pattern section, and a fourth pattern section having a shape different from those of both the first pattern section and the second pattern section,
    wherein the first sub pixel electrode and the second sub pixel electrode are electrically interconnected, and
    wherein lengths of the first to fourth pattern sections in the first direction are the same, and a length of the fourth pattern section in the second direction is shorter than each of lengths of the first to third pattern sections in the second direction.

2. The liquid crystal display panel of claim 1, wherein each of the first to third pattern sections includes a central pattern part as a central region, and a branch pattern part extending from the central pattern part in a direction oblique to the first and second directions.

3. The liquid crystal display panel of claim 1, wherein each of the first and second sub pixel electrodes is plural in number, and the second sub pixel electrode is disposed adjacent to the first and second data lines.

4. The liquid crystal display panel of claim 3, wherein the fourth pattern section is disposed closer to the first and second data lines than the third pattern section.

5. The liquid crystal display panel of claim 1, wherein the fourth pattern section has a rectangular shape.

6. The liquid crystal display panel of claim 1, wherein the fourth pattern section has a shape in which an end of an edge opposite to the third pattern section is cut out.

7. The liquid crystal display panel of claim 1, wherein the fourth pattern section includes a branch pattern part formed at an edge opposite to the third pattern section,
wherein the branch pattern part of the fourth pattern section is disposed in an area smaller than that of a branch pattern part of the third pattern section.

8. A liquid crystal display panel comprising:
a first gate line and a second gate line extending in a first direction;
a first data line and a second data line extending in a second direction intersecting the first direction;
a reference voltage line which is interposed between the first and second data lines and extends in the second direction;
a pixel region surrounded by the first and second gate lines and the first and second data lines; and
a first pixel electrode and a second pixel electrode disposed in the pixel region;
a first switching element connected to the first data line, the first gate line and the first pixel electrode;
a second switching element connected to the first data line, the first gate line and the second pixel electrode; and
a third switching element connected to the reference voltage line, the first gate line and the first pixel electrode,
wherein the first pixel electrode includes,
first sub pixel electrodes each including a first pattern section and a second pattern section symmetrical with each other in the second direction, and
second sub pixel electrodes each including a third pattern section having a same shape as that of either the first pattern section or the second pattern section, and a fourth pattern section having a shape different from those of both the first pattern section and the second pattern section,
wherein the first sub pixel electrode and the second sub pixel electrode are electrically interconnected, and
wherein the first pixel electrode is plural in number and electrically interconnected, the first sub pixel electrodes are plural in number and electrically interconnected, and the second sub pixel electrodes are plural in number and electrically interconnected, and
wherein the second pixel electrode further includes a detour part which interconnects two sub pixel electrodes which are not adjacent to each other among the plurality of first and second sub pixel electrodes.

9. The liquid crystal display panel of claim 8, wherein lengths of the first to fourth pattern sections in the first direction are the same, and a length of the fourth pattern section in the second direction is shorter than each of lengths of the first to third pattern sections in the second direction.

10. The liquid crystal display panel of claim 9, wherein each of the first to third pattern sections includes a central pattern part as a central region, and a branch pattern part extending from the central pattern part in a direction oblique to the first and second directions.

11. The liquid crystal display panel of claim 9, wherein the reference voltage line overlaps a boundary in which the third pattern section and the fourth pattern section contact each other.

12. The liquid crystal display panel of claim 9, wherein the second sub pixel electrode is disposed adjacent to the first and second data lines,
wherein the fourth pattern section is disposed closer to the first and second data lines than the third pattern section.

13. The liquid crystal display panel of claim 9, wherein the fourth pattern section has a rectangular shape.

14. The liquid crystal display panel of claim 9, wherein the fourth pattern section includes a branch pattern part formed at an edge opposite to the third pattern section,
wherein the branch pattern part of the fourth pattern section is disposed in an area smaller than that of a branch pattern part of the third pattern section.

15. The liquid crystal display panel of claim 8, wherein the detour part partially overlaps at least one of the first gate line and the second gate line.

16. The liquid crystal display panel of claim 8, wherein a data voltage applied to the first data line and a reference voltage applied to the reference voltage line have the same polarity with respect to that of a common voltage.

17. The liquid crystal display panel of claim 16, wherein a voltage difference between the first pixel electrode and the common voltage is larger than a voltage difference between the second pixel electrode and the common voltage.

* * * * *